United States Patent
Kobayashi

Patent Number: 5,597,224
Date of Patent: Jan. 28, 1997

[54] STROBOSCOPIC DEVICE FOR HOLDING A TRIGGER LEAD

[75] Inventor: Hideo Kobayashi, Omiya, Japan

[73] Assignee: Fuji Photo Optical Co. Ltd, Omiya, Japan

[21] Appl. No.: 416,350

[22] Filed: Apr. 4, 1995

[30] Foreign Application Priority Data

Apr. 14, 1994 [JP] Japan .................... 6-101987

[51] Int. Cl.⁶ .................... G03B 15/03
[52] U.S. Cl. ............ 362/16; 362/263; 439/456; 396/171; 396/176
[58] Field of Search ............ 362/3, 16, 217, 362/263, 265; 354/149.11, 145.1; 315/200 A, 241 P, 241 S; 439/456, 457, 458

[56] References Cited

U.S. PATENT DOCUMENTS

| | | | |
|---|---|---|---|
| 4,156,890 | 5/1979 | Hebert et al. | 362/16 |
| 4,412,276 | 10/1983 | Blinow | 362/16 |
| 5,371,563 | 12/1994 | Dassero et al. | 354/149.11 |

*Primary Examiner*—Ira S. Lazarus
*Assistant Examiner*—Sara Sachie Raab

[57] ABSTRACT

The present invention is a device which is capable of holding and fixing a trigger lead with firmness and reliability to a reflector without fixing by soldering or screws. This device forms an opening portion in the back surface of a housing for holding the reflector. In this opening portion there is provided an elastic interposing member, and the core wire of the trigger lead is interposed between this interposing member and the reflector. According to this, the core wire can be held firmly by the elastic interposing member, and also the connection state of the core wire to the reflector can be checked. Also, a holding member comprising bar-shaped projections is provided near the interposing member, and the firm fixation state of the trigger lead can be obtained by winding and fixing the trigger lead to this holding member.

5 Claims, 3 Drawing Sheets

5,597,224

STROBOSCOPIC DEVICE FOR HOLDING A TRIGGER LEAD

BACKGROUND OF THE INVENTION

This application claims the priority of Japanese Patent Application No. 6-101987 filed on Apr. 14, 1994, which is incorporated herein by reference.

1. Field of the Invention

The present invention relates to a stroboscopic device, and more particularly to a device of the type in which a trigger lead for supplying a trigger signal is contacted directly to a reflector.

2. Description of the Prior Art

It is well known in photography to employ a stroboscope device which lights a xenon lamp as needed and to supplement the light and prevent underexposure when taking a photograph. In this kind of stroboscopic device, a trigger signal is supplied through a reflector (reflecting mirror) to a lamp to emit light. Therefore, in this case a trigger lead for supplying a trigger signal is connected to the reflector with a mounting member such as a trigger connecting member, and in this connection the fixation is done by soldering or screws.

FIGS. 5 and 6 show a conventional stroboscopic device, in which the above-described trigger lead is mounted without using a mounting member such as a connecting member. More particularly, a reflector 2 of a lamp 1 is integrally formed with a mounting member 3 which is fitted in a predetermined position on the outer surface of a case 4 to fix the reflector 2 to the case 4. A core wire 6 of a trigger lead 5 is then interposed between the back portion of the reflector 2 and the side portion of the case 4 and, consequently, the trigger 5 is fixed to the reflector 2.

The mounting of the trigger lead 5 of FIG. 5, however, has the problem that the trigger lead 5 is easily disconnected and low in reliability. On the other hand, in the method of soldering the core wire with a trigger connecting member or fixing by screws, there is the problem that the number of parts is increased and also a large number of assembly processes is required.

Also, in the mounting of FIG. 5 the trigger lead 5 is interposed in the state shown in FIG. 6, so when it is firmly fixed, there is the possibility that the reflector 2 is undesirably deformed and the stroboscopic distribution of light becomes inaccurate. Further, since the connection state becomes as shown in FIG. 6, there is also the problem that the interposition (fixation) state of the core wire (distal end) 6 cannot be checked.

SUMMARY OF THE INVENTION

The present invention has been made in view of the above-described problems and, accordingly, an important object of the invention is to provide a stroboscopic device for holding a trigger lead which is capable of holding and fixing the trigger lead with firmness and reliability to a reflector without fixing by soldering or screws.

To achieve this end, there is provided in accordance with one important aspect of the present invention a stroboscopic device for holding a trigger lead which comprises a housing for contacting a core wire of the trigger lead directly to a reflector of a lamp and interposing the core wire therebetween, and a holding member for holding the trigger lead with it bent at least one time. The holding member is integrally formed in the housing near a contact portion of the core wire of the trigger lead.

The foregoing object is also achieved in accordance with another important aspect of the present invention by providing a stroboscopic device for holding a trigger lead which comprising a housing for holding a reflector of a lamp, an opening portion formed in the housing for exposing a back surface of the reflector, an interposing member disposed in the opening portion and integrally formed in the housing, the interposing member having elastic force for contacting a core wire of the trigger lead to the reflector and interposing it therebetween, and a holding member for holding the trigger lead with it bent at least one time. The holding member is integrally formed in the housing near a contact portion of the core wire of the trigger lead.

In the above, the holding member may comprise a plurality of bar-shaped projections. Each of the opposite projections of the plurality of bar-shaped projections may also be formed at its distal end into an L-letter shape. Further, the holding member may be formed with a plurality of bores through which the trigger lead is passed.

According to the above-described constitution, two or three projections, which are the holding member, are formed at intervals that pass the trigger lead therethrough, and the trigger lead is passed between these projections, bent once or twice and disposed in that state. Then, by interposing the core wire of the distal end of this trigger lead between the housing and the reflector, the connection of the trigger lead is completed. Therefore, the trigger lead is wound on the holding member and firmly held on the holding member, so the reliable connection of the trigger lead becomes possible without using a connection member, soldering, or screw connection. Moreover, there is the advantage that the number of parts is decreased and the number of assembly processes is reduced.

In addition, if an elastic interposing member is used, there will be the advantage that the reflector has no deformation because the trigger lead is connected to the back surface of the reflector with appropriate pressure, and the interposition state can be checked because the interposing member can be mounted in the state that the distal end of the core wire can be seen.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

First Embodiment

Figure 1:
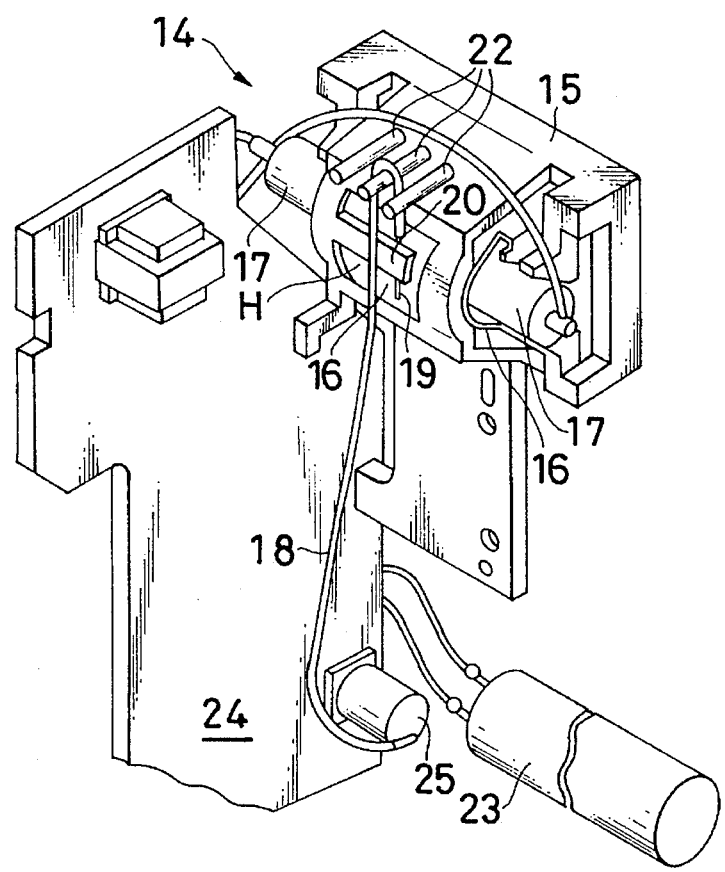
FIG. 1 is a perspective view showing a stroboscopic device for holding a trigger lead, constructed in accordance with a first embodiment of the present invention.
Figure 2:
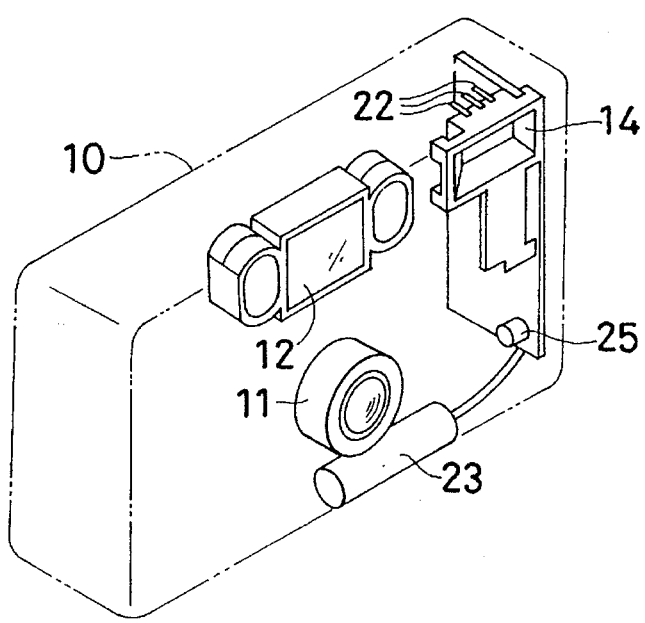
FIG. 2 is a perspective view showing the entire camera of the embodiment.

FIG. 1 shows a stroboscopic device for holding a trigger lead according to the first embodiment of the present invention, and FIG. 2 shows a camera. As shown in FIG. 2, in the camera 10 a camera lens 11 and a finder 12 are disposed, and the stroboscopic device 14 is provided in the upper right portion of the camera 10. The rear side of this stroboscopic device 14 is shown in FIG. 1. In the figure, a strobe housing 15 comprising a synthetic resin material houses therein a reflector (reflecting mirror) 16 and a lamp 17 and is integrally formed at an opening portion H on the back side thereof with an interposing member 20 for interposing a core wire 19 of a trigger lead 18. This interposing member 20 is formed from a synthetic resin of predetermined length so that it is given a predetermined elastic force. The interposing member 20 can contact the core wire 19 of the trigger lead 18 directly to the back surface of the reflector 16 with an appropriate pressing force. Therefore, there is the advantage that the reflector 16 has no deformation and, as shown in FIG. 1, the connection state of the core wire 19 to the reflector 16 can be checked in the mounting.

A holding member 22 comprising three pin projections disposed at almost the same intervals as the diameter of the trigger 18 is disposed above the interposing member 20. Note that the lamp 17 is connected with a main capacitor 23 and the trigger lead 18 is connected to a trigger transducer 25 disposed on the side board 24.

According to the constitution of the first embodiment such as this, the trigger lead 18 extending from the lower trigger transducer 25 is passed between the three pin projections which are the holding member 22, and bent back once, as shown. Then, by interposing the core wire 19 of the distal end of the trigger lead 18 between the interposing member 20 under the holding member 22 and the reflector 16, the connection of the trigger lead 18 that is directly to the reflector 16 is completed. According to this, the bent portion of the trigger lead 18 is firmly held by the holding member 22 of the three pin projections, and even if the trigger lead 18 were pulled down, there would be no possibility that the core wire 19 is disconnected from the interposing member 20.

In addition, there is the advantage that the contact state of the core wire 19 interposed by the interposing member 20 with the reflector 16 can be checked and inspected and the reliable connection of the trigger lead 18 can be achieved.

While in the above-described first embodiment, three pin projections have been arranged horizontally, the center pin projection may be mounted in a slightly higher position and the opposite pin projections may be disposed closer to the center side.

Second Embodiment

Figure 3:
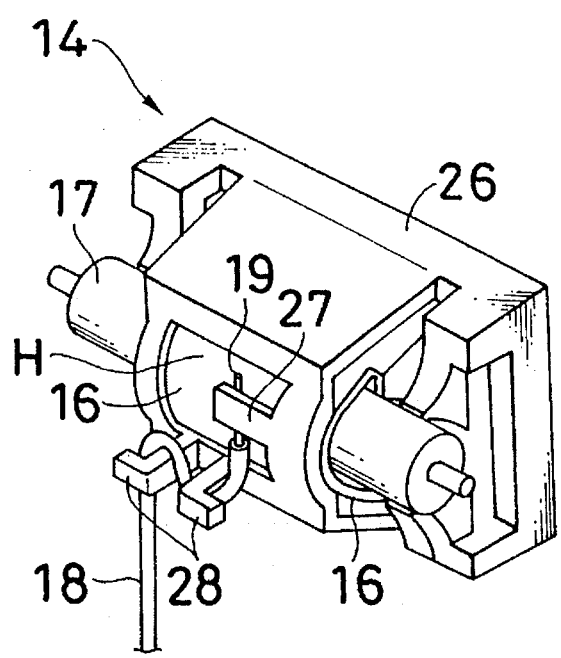
FIG. 3 is a perspective view showing a stroboscopic device of a second embodiment of the present invention.

FIG. 3 shows the second embodiment of the present invention, in which a holding member 28 is provided to the lower side of an interposing member 27 disposed in the backside opening portion H of the strobe housing 26. This holding member 28 comprises two L-shaped projections disposed in opposite directions. By bending the trigger lead 18 twice, as shown in FIG. 3, the core wire 19 of the distal end of the lead 18 can be interposed from the lower side between the interposing member 27 and the reflector 16. In the case, there is the advantage that even if the length of the trigger projection is short, the trigger lead 18 can firmly be held because of the L-letter shape.

Figure 4:
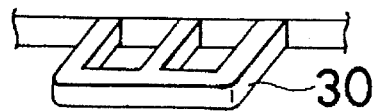
FIG. 4(A) is a diagram showing a modification of the holding member.
FIG. 4(B) is a diagram showing another modification of the holding member.
Figure 4:
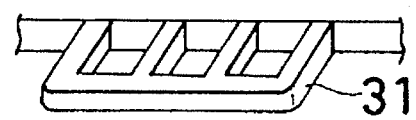

While in the above-described embodiments the holding member 22 comprising pin projections and the holding member 28 comprising L-shaped projections have been used, the present invention is not limited to these members. Instead of these members, in the first embodiment a plate-shaped holding member 30 formed with two bores, such as the one shown in FIG. 4(A), may be used and in the second embodiment a plate-shaped holding member 31 formed with three bores, such as the one shown in FIG. 4(B), may be used. In the case of the holding member 30 the trigger lead 18 is passed through the two bores and bent once, and in the case of the holding member 31 the trigger lead 18 is passed through the three bores and bent twice. In this way, the trigger lead 18 can firmly be held in the same arrangement state as the above embodiments.

Figure 5:
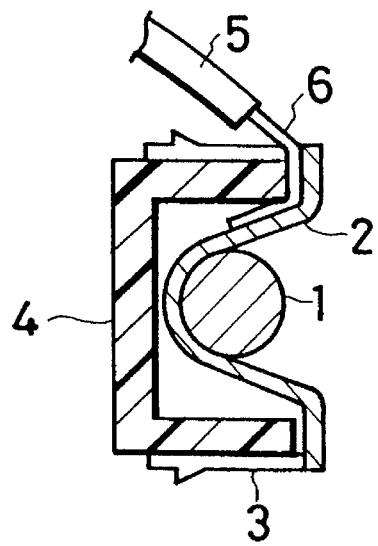
FIG. 5 is a cross sectional view showing an example of a conventional stroboscopic device.
Figure 6:
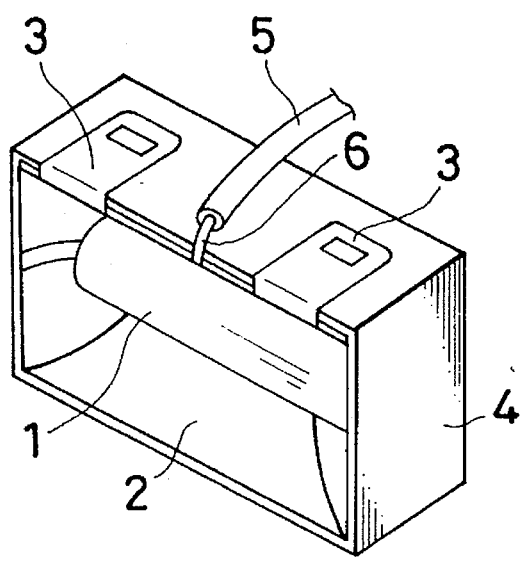
FIG. 6 is a front perspective view showing the device of FIG. 5.

Also, according to the present invention, there are also the following advantage. In the above-described conventional device (FIGS. 5 and 6), the trigger lead 5 must be assembled to the reflector 2 while the trigger lead 5 is being pressed with hands, because the trigger lead 5 is not fixed reliably to the case 4 when assembling. The present invention, however, has the advantage that the device is easy to assemble, because the reflector 16 is assembled after the trigger lead 18 has been fixed to the holding member 22 or 28.

What is claimed is:

1. A stroboscopic device for holding a trigger lead, comprising:

a housing elastic interposing member for contacting a core wire of said trigger lead directly to a reflector of a lamp said core wire being interposed between said reflector and said housing; and a holding member for holding said trigger lead with said lead bent at least one time, the holding member being integrally formed in said housing at an end of said trigger lead where a contact portion of said core wire contacts said reflected lamps.

2. A stroboscopic device for holding a trigger lead, comprising:

a housing for holding a reflector of a lamp;

an opening portion formed in said housing for exposing a back surface of said reflector;

an interposing member integrally formed in said housing disposed in said opening portion, the interposing member having elastic force for contacting a core wire of said trigger lead to said reflector and interposing the core wire between said reflector and said housing; and a holding member for holding said trigger lead with said lead bent at least one time, the holding member being integrally formed in said housing at an end of said trigger lead wire contact portion of said core wire of said trigger lead.

3. The stroboscopic device for holding a trigger lead as set forth in claim 1, wherein said holding member comprises a plurality of bar-shaped projections.

4. The stroboscopic device for holding a trigger lead as set forth in claim 3, wherein each of the opposite projections of said plurality of bar-shaped projections has an L-Letter shaped formed at a distal end.

5. The stroboscopic device for holding a trigger lead as set forth in claim 1, wherein said holding member is formed with a plurality of bores through which said trigger lead is passed.

* * * * *